United States Patent
Chatterjee et al.

(10) Patent No.: US 11,947,799 B1
(45) Date of Patent: Apr. 2, 2024

(54) SYSTEMS AND METHODS FOR USING THE TRIM COMMAND WITH SOLID STATE DEVICES

(71) Applicant: Amzetta Technologies, LLC, Norcross, GA (US)

(72) Inventors: Paresh Chatterjee, Fremont, CA (US); Sharon Samuel Enoch, Dacula, GA (US); Venugopalreddy Mallavaram, Duluth, GA (US); Senthilkumar Ramasamy, Duluth, GA (US)

(73) Assignee: Amzetta Technologies, LLC, Norcross, GA (US)

( * ) Notice: Subject to any disclaimer, the term of this patent is extended or adjusted under 35 U.S.C. 154(b) by 0 days.

(21) Appl. No.: 17/869,307

(22) Filed: Jul. 20, 2022

Related U.S. Application Data

(63) Continuation of application No. 17/068,166, filed on Oct. 12, 2020, now abandoned.

(Continued)

(51) Int. Cl.
*G06F 3/06* (2006.01)

(52) U.S. Cl.
CPC ............ *G06F 3/061* (2013.01); *G06F 3/0616* (2013.01); *G06F 3/0631* (2013.01); *G06F 3/064* (2013.01);
(Continued)

(58) Field of Classification Search
CPC ...... G06F 3/061; G06F 3/0616; G06F 3/0631; G06F 3/064; G06F 3/0652; G06F 3/0659; G06F 3/0665; G06F 3/067; G06F 3/0689
(Continued)

(56) References Cited

U.S. PATENT DOCUMENTS

| | | |
|---|---|---|
| 6,839,827 B1 | 1/2005 | Beardsley et al. |
| 7,085,879 B2 | 8/2006 | Aasheim et al. |

(Continued)

OTHER PUBLICATIONS

Chris Evans, Enterprise Computing: Thin Provisioning and the Cookie Monster,Nov. 17, 2009, Storage Architect Blog at wordpress.com, http://thestoragearchitect.wordpress.com/tag/thick-provisioning/ 4 pages.

(Continued)

*Primary Examiner* — Than Nguyen
(74) *Attorney, Agent, or Firm* — Meunier Carlin & Curfman LLC

(57) ABSTRACT

Described herein are systems and methods for performing TRIM commands in a data storage system. An example data storage system can include physical storage including a solid state drive (SSD), and a storage system computer operably coupled to the physical storage. The storage system computer can include a processing unit and a memory operably coupled to the processing unit. The data storage system can further include a distributed volume management (DVM) module stored in the memory that, when executed by the processing unit, causes the processing unit to: allocate a logical volume from the physical storage; subdivide the logical volume into a plurality of logical blocks; maintain a mapping table for tracking the logical blocks of the logical volume; and in response to a predetermined event, execute a TRIM command for one or more unused data blocks of the SSD.

20 Claims, 9 Drawing Sheets

Related U.S. Application Data

(60) Provisional application No. 62/913,781, filed on Oct. 11, 2019.

(52) U.S. Cl.
CPC .......... *G06F 3/0652* (2013.01); *G06F 3/0659* (2013.01); *G06F 3/0665* (2013.01); *G06F 3/067* (2013.01); *G06F 3/0689* (2013.01)

(58) Field of Classification Search
USPC ......................................................... 711/154
See application file for complete search history.

(56) References Cited

U.S. PATENT DOCUMENTS

| | | |
|---|---|---|
| 7,509,409 B2 | 3/2009 | Penny et al. |
| 7,536,529 B1 | 5/2009 | Chatterjee et al. |
| 7,603,529 B1 | 10/2009 | Machardy et al. |
| 7,711,897 B1 | 5/2010 | Chatterjee et al. |
| 7,747,835 B1 | 6/2010 | Chatterjee et al. |
| 8,370,597 B1 | 2/2013 | Chatterjee et al. |
| 8,479,046 B1 | 7/2013 | Bailey et al. |
| 8,713,066 B1 | 4/2014 | Lo et al. |
| 9,519,438 B1 | 12/2016 | Chatterjee et al. |
| 10,019,362 B1 | 7/2018 | Chatterjee et al. |
| 10,089,227 B1 | 10/2018 | Subramanian et al. |
| 10,176,212 B1 | 1/2019 | Prohosfsky |
| 2002/0161983 A1 | 10/2002 | Milos et al. |
| 2003/0023811 A1 | 1/2003 | Kim et al. |
| 2006/0212481 A1 | 9/2006 | Stacey et al. |
| 2006/0253681 A1 | 11/2006 | Zohar et al. |
| 2007/0156957 A1 | 7/2007 | Machardy et al. |
| 2007/0220071 A1 | 9/2007 | Anzai et al. |
| 2008/0104343 A1 | 5/2008 | Miyagaki et al. |
| 2009/0043978 A1 | 2/2009 | Sawdon et al. |
| 2010/0023566 A1 | 1/2010 | Minamino et al. |
| 2010/0191779 A1 | 7/2010 | Hinrichs |
| 2010/0287408 A1 | 11/2010 | Kopylovitz |
| 2013/0326161 A1 | 12/2013 | Cohen et al. |
| 2014/0129758 A1 | 5/2014 | Okada et al. |
| 2014/0359198 A1 | 12/2014 | Zaltsman et al. |
| 2016/0057224 A1* | 2/2016 | Ori .......................... G06F 3/065 709/213 |
| 2018/0046231 A1 | 2/2018 | Raghu et al. |
| 2019/0369892 A1 | 12/2019 | Huang et al. |
| 2021/0404930 A1* | 12/2021 | Hildreth ................... G01N 9/26 |
| 2022/0137855 A1* | 5/2022 | Irwin .................... G06F 3/0671 711/154 |

OTHER PUBLICATIONS

Hitachi Data Systems and Symantec Corporation, Thin Provisioning and Storage Reclamation, Jul. 2010, 18 pages.

\* cited by examiner

US 11,947,799 B1

SYSTEMS AND METHODS FOR USING THE TRIM COMMAND WITH SOLID STATE DEVICES

CROSS-REFERENCE TO RELATED APPLICATIONS

This application is a continuation of U.S. patent application Ser. No. 17/068,166, filed on Oct. 12, 2020, which claims the benefit of U.S. provisional patent application No. 62/913,781, filed on Oct. 11, 2019, and entitled "SYSTEMS AND METHODS FOR USING THE TRIM COMMAND WITH SOLID STATE DEVICES," the disclosures of which are expressly incorporated herein by reference in their entireties.

BACKGROUND

Solid state drives (SSDs) suffer from degradation of performance over time due to the undesirable phenomenon of write amplification. Write amplification occurs in SSDs because the amount of data written to the drive is a multiple of the intended amount of data to be written. For example, every write to a location on an SSD requires erasing the existing data and then performing the new write at the location (i.e., rewriting data) or writing to a new location (i.e., moving data). Due to write amplification, the lifetime of the SSD is reduced considerably. Additionally, write amplification taxes the resources of the data storage system.

SUMMARY

Described herein are systems and methods for performing TRIM commands in a data storage system. An example data storage system can include physical storage including a solid state drive (SSD), and a storage system computer operably coupled to the physical storage over a network. The storage system computer can include a processing unit and a memory operably coupled to the processing unit. The data storage system can further include a distributed volume management (DVM) module stored in the memory that, when executed by the processing unit, causes the processing unit to: allocate a logical volume from the physical storage; subdivide the logical volume into a plurality of logical blocks; maintain a mapping table for tracking the logical blocks of the logical volume; and in response to a predetermined event, execute a TRIM command for one or more unused data blocks of the SSD over the network.

In some implementations, the data storage system can include a redundant array of inexpensive disks (RAID) management layer stored in the memory that, when executed by the processing unit, can cause the processing unit to abstract organization of one or more RAID arrays of the physical storage system and present a logical block-level interface to the DVM module. Additionally, the DVM module, when executed by the processing unit, can causes the processing unit to consult the RAID management layer to maintain the mapping table.

Alternatively or additionally, the DVM module, when executed by the processing unit, can further cause the processing unit to determine the one or more unused data blocks of the SSD by consulting the mapping table.

Alternatively or additionally, the predetermined event can be deletion of a snapshot.

Alternatively or additionally, the predetermined event can be deletion of a file or a threshold number of files.

Alternatively or additionally, the predetermined event can be modification of the mapping table in response to an UNMAP command or a WRITE SAME command issued by an application or operating system (OS) running on an initiator device.

Alternatively or additionally, the predetermined event can be demotion of data from the SSD to a lower-tier storage device in the physical storage.

Alternatively or additionally, the data storage system can further include an SSD cache, and the predetermined event can be flushing of the SSD cache to the physical storage.

Alternatively or additionally, the DVM module, when executed by the processing unit, can further cause the processing unit to determine input/output (I/O) load of the data storage system, and the TRIM command can be executed when the I/O load is less than a threshold.

Alternatively or additionally, the logical blocks can include at least one of a territory or a provision.

An example non-transitory computer-readable recording medium is also described herein. The computer-readable recording medium can have computer-executable instructions stored thereon for performing TRIM operations with a distributed volume management (DVM) module that, when executed by a processing unit of a storage system computer, cause the processing unit to: allocate a logical volume from the physical storage including a solid state drive (SSD); subdivide the logical volume into a plurality of logical blocks; maintain a mapping table for tracking the logical blocks of the logical volume; and in response to a predetermined event, execute a TRIM command for one or more unused data blocks of the SSD.

An example computer-implemented method is also described herein. The method can be implemented by a distributed volume management (DVM) module of a data storage system. The method can include allocating a logical volume from the physical storage including a solid state drive (SSD); subdividing the logical volume into a plurality of logical blocks; maintaining a mapping table for tracking the logical blocks of the logical volume; and in response to a predetermined event, executing a TRIM command for one or more unused data blocks of the SSD over a network.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for using the TRIM command with SSDs, it will become evident to those skilled in the art that the implementations are not limited thereto.

Figure 1:
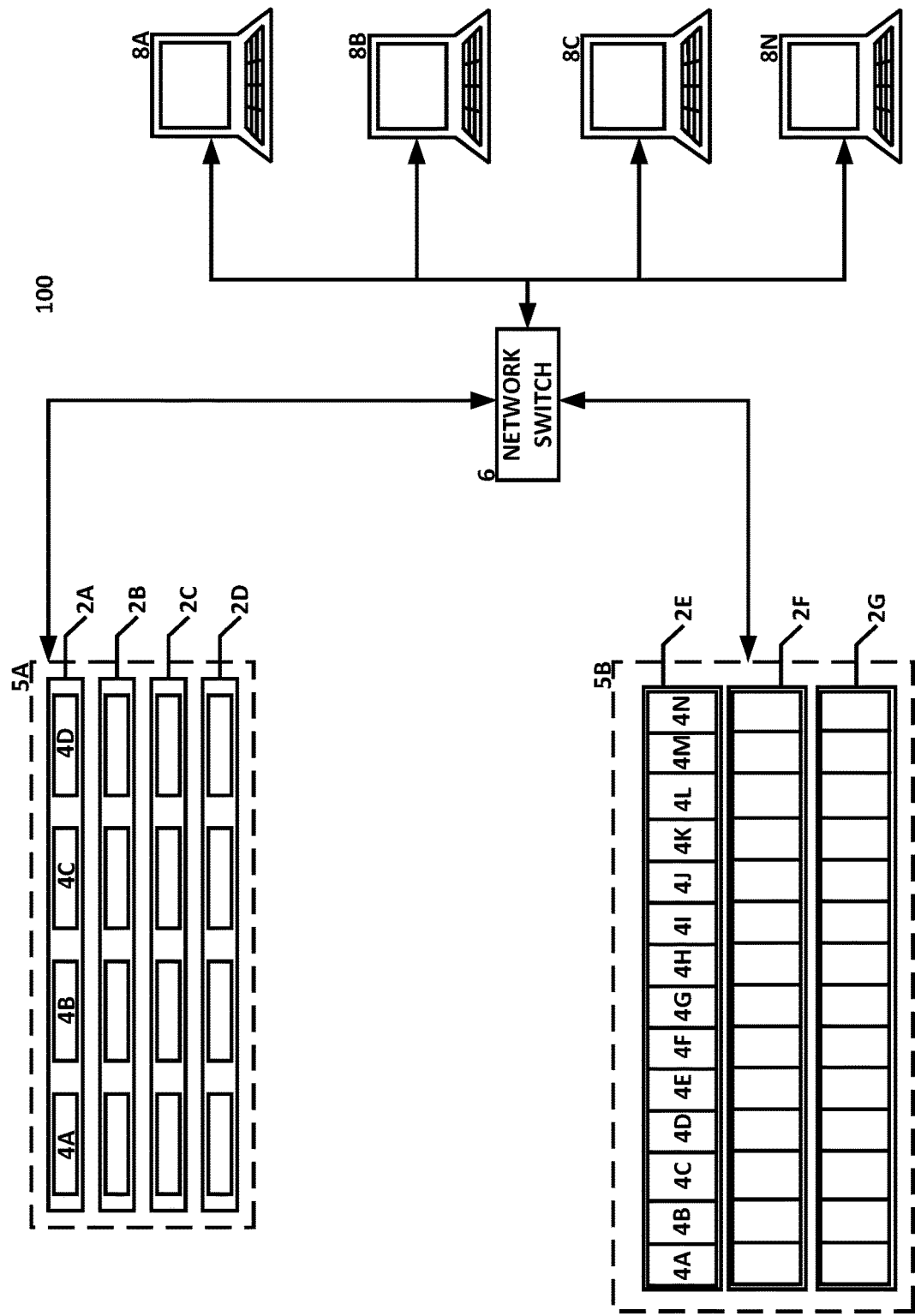
FIG. 1 is a network architecture diagram illustrating aspects of a data storage system according to an implementation described herein.

Turning now to FIG. 1, details will be provided regarding an illustrative operating environment for the implementations presented herein, as well as aspects of several software components that provide the functionality described herein for using the TRIM command with SSDs. In particular, FIG. 1 is a network architecture diagram showing aspects of a data storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as a solid state devices (SSDs) or a hard disk drive (HDDs). This disclosure contemplates that the SSDs can optionally include one or more NVMe SSDs. This disclosure also contemplates that that the SAS drives can have different rotational speeds such as 7,000 RPM (sometimes referred to as nearline (NL) SAS), 10,000 RPM, or 15,000 RPM. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries. Additionally, the storage server computers 2A-2G can be operably coupled to the mass storage devices over a network. This disclosure contemplates that the network, such as a LAN, a WAN, a MAN, a fiber ring, a fiber star, wireless, optical, satellite, or any other network technology, topology, protocol, or combination thereof.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes fourteen hard disk drives 4A-4N (collectively, disks 4). Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk drives, SSDs, or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C, and 2D. The cluster 5B may similarly stripe data across the storage nodes 2E, 2F, and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to the various implementations, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network (WAN), such as the Internet. An appropriate protocol, such as the Internet Small Computer Systems Interface (iSCSI) protocol, the Serial Attached SCSI (SAS) protocol, or the nonvolatile memory express (NVMe) protocol may be utilized to enable the initiators 8A-8D to communicate with and utilize the various functions of the storage clusters 5A-5B over a wide area network such as the Internet. iSCSI, SAS, and NVMe protocols are known in the art and are therefore not described in further detail herein.

Two or more disks 4 within each cluster 5A-5B or across clusters 5A-5B may be mirrored for data redundancy and protection against failure of one, or more, of the disks 4. Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers. As described herein, physical storage of the data storage system can include one or more SSDs and/or other type of high speed high capacity storage devices.

The techniques for performing TRIM operations with SSDs as described herein can be provided by one or more storage server computers 2A-2G. Furthermore, this disclosure contemplates the processes for implementing the TRIM command can execute on any of storage server computers 2A-2G or can operate in a distributed fashion with components executing across two or more storage server computers 2A-2G.

Figure 2:
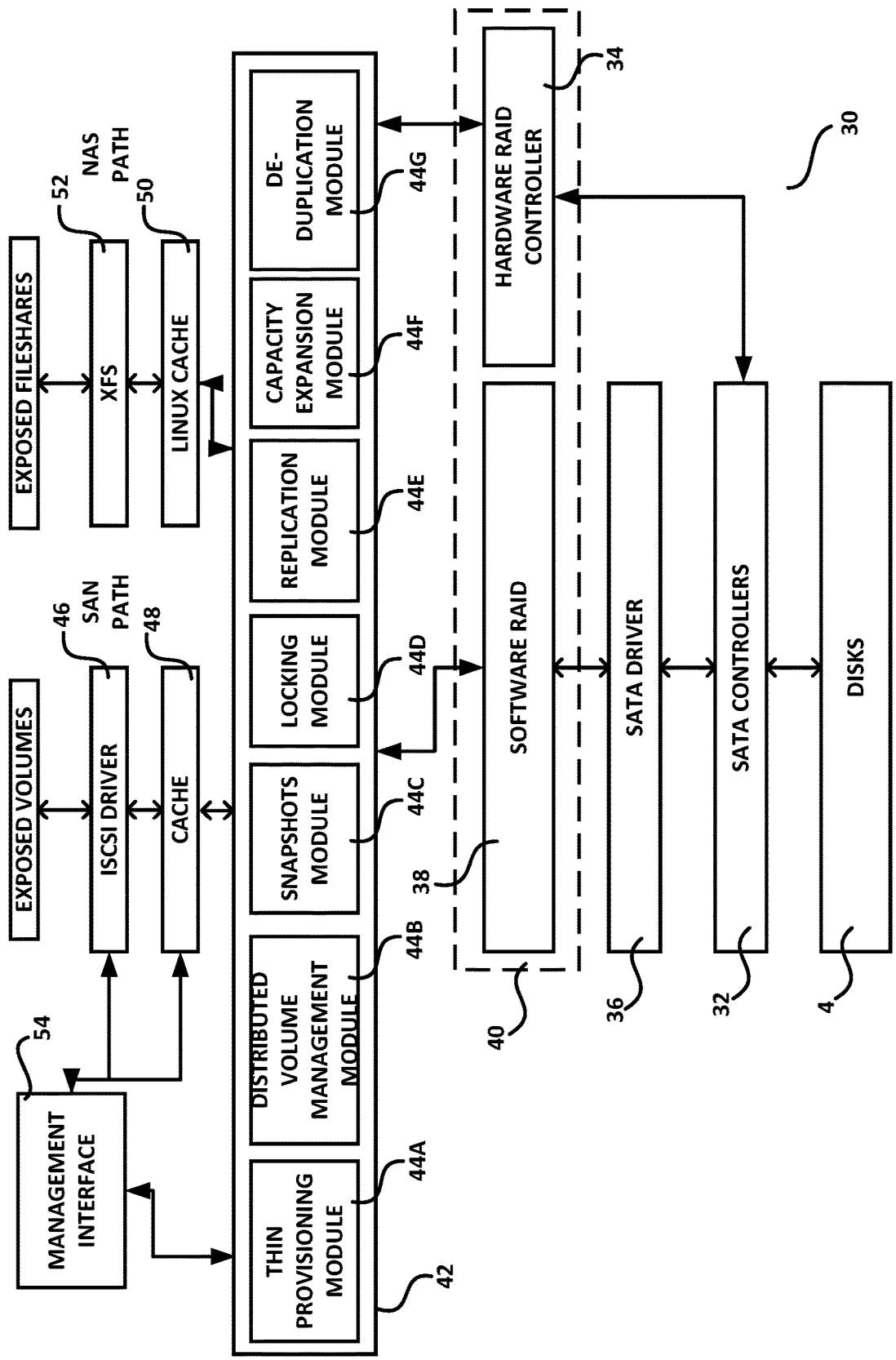
FIG. 2 is an illustrative computer software architecture for practicing the various implementations of the present disclosure.

Turning now to FIG. 2, an illustrative computer software architecture for practicing the various implementations of the present disclosure will now be described. In particular, FIG. 2 illustrates a storage stack 30. At the top of the storage stack 30, storage volumes or fileshares are exposed to the initiators 8A-8D shown in FIG. 1. At the bottom of the storage stack 30 are the actual mass storage devices, such as the SSDs and/or disks 4 shown in FIG. 1, which are utilized to store the data. The mass storage devices are, in turn, connected to a disk controller, such as a Serial ATA (SATA) controller 32 or a hardware RAID controller 34. In the case of a SATA controller, a SATA driver 36 may be utilized to access the hardware device. Although a SATA controller 32 and SATA driver 36 are shown in FIG. 2, this disclosure contemplates that the storage stack 30 can include controllers and/or drivers for other types of disks or drives including, but not limited to, NVMe SSDs, SSDs, and SAS drives. Additionally, a software RAID module 38 may also be utilized to provide RAID services in the absence of a hardware RAID controller 34. A unified RAID management layer 40 may be utilized to simplify the utilization of RAID with either software or hardware implementations.

Above the unified RAID management layer 40 sits a device driver 42 that implements the functions described herein. In particular, the device driver 42 can provide functionality for implementing thin provisioning (e.g., with thin provisioning module 44A), virtualization (e.g., with distributed volume management (DVM) module 44B), snapshots (e.g., with snapshots module 44C), locking (e.g., with locking module 44D), replication (e.g., with replication module 44E), capacity expansion (e.g., with capacity expansion module 44F), and/or de-duplication (e.g., with de-duplication module 44E). Modules 44A-44G can be implemented on a storage server computer (e.g., the storage node 2 shown in FIG. 1) in software, hardware or a combination thereof. Above the device driver 42, a number of software components are utilized depending upon the access mechanism utilized to access the data stored on the hard disk drives 4. In particular, a Storage Area Network (SAN) path is provided that utilizes a cache 48 and an Internet Small Computer Systems Interface (iSCSI) driver 46. A Network Attached Storage (NAS) path is also provided that utilizes a LINUX cache 50 and the XFS high-performance journaling file system 52. Volumes are exposed through the SAN path while fileshares are exposed through the NAS path.

It should be appreciated that the device driver 42 comprises a LINUX-compatible mass storage device driver in the implementations of the present disclosure. However, although the various implementations of the present disclosure are described as being implemented within a LINUX-compatible device driver, the various aspects may be implemented at different points within the storage stack and in conjunction with other operating systems. For instance, the aspects of the disclosure may be implemented with the FREEBSD operating system or with the WINDOWS family of operating systems from MICROSOFT CORPORATION of Redmond, Washington.

According to embodiments of the disclosure, a management interface 54 may also be provided for controlling and monitoring the various aspects of the present disclosure. The management interface communicates with the various layers through software interfaces to retrieve performance data, provide configuration data, and to perform other functions.

As described herein, the DVM module 44B can be configured to execute the TRIM operations with SSDs. For example, the DVM module 44B can allocate a logical volume from physical storage such as disks 4 shown in FIGS. 1 and 2 and/or one or more SSDs. The DVM module 44B can consult the RAID management layer 40 to enable execution of the TRIM operations as described herein. In some implementations, the unified RAID management layer 40 can abstract the organization of a RAID array (e.g., formed using disks 4) and presents a logical block-level interface to the DVM module 44B, and the DVM module 44B can allocate logical blocks from the RAID array. Thus, the DVM module 44B can use the block-level interface provided by the unified RAID management layer 40 to manage the available physical storage capacity of the data storage system and service I/O operations initiated by the initiators 8A-8N shown in FIG. 1. Optionally, the available physical storage capacity of the data storage system can be provisioned on an as-needed basis, for example, as new writes are received. This is referred to as thin provisioning and can be implemented by the thin provisioning module 44A. The DVM module 44B can subdivide the logical volume into a plurality of logical blocks including, but are not limited to, territories and/or provisions (e.g., as described below with regard to FIG. 4). Volume virtualization provides the facility to create and manage multiple logical volumes, as well as expand a logical volume across multiple storage nodes (e.g., storage nodes 2 shown in FIG. 1) within a storage cluster (e.g., storage cluster 5A and/or 5B shown in FIG. 1). The available physical storage capacity of the data storage system can be divided into a number of unique, equally-sized areas referred to as territories and further subdivided into unique, equally-sized areas referred to as provisions. A territory can optionally be an 8 MB portion of the available storage capacity and a provision can optionally be a 512 KB portion of the available storage capacity, for example. Alternatively, it should be understood that a territory and a provision can optionally have a size more or less than 8 MB and 512 KB, respectively.

The DVM module 44B can also maintain a mapping table (e.g., the system and/or volume tables described below with respect to FIGS. 5 and 6) for tracking the logical blocks of the logical volume. The DVM module 44B can consult the RAID management layer 40 to obtain the information needed to maintain the mapping table(s). The DVM module 44B therefore has a logical block tracking mechanism and has knowledge of which data has been utilized, which data has been modified, and which data has not been used at all. Thus, in accordance with aspects of the present disclosure, the TRIM operations with the SSDs can take advantage of the knowledge of the DVM module 44B. The TRIM operations are therefore executed by the DVM layer 44B, which maintains its own mapping table(s). As described below, this is in contrast to executing TRIM commands with an application or OS running on an initiator (e.g., a higher layer in the storage stack 30) or with the unified RAID management layer 40 (e.g., a lower layer in the storage stack 30).

As described above, the device driver 42 can optionally implement other functionality. Snapshots provide functionality for creating and utilizing point-in-time snapshots of the contents of logical storage volumes. This functionality can optionally be implemented using the snapshot module 44C. Locking functionality allows for synchronizing I/O operations within the storage node 2 shown in FIG. 1 or across nodes within the storage cluster 5A and/or 5B shown in FIG. 1. This functionality can optionally be implemented using the locking module 44D. Data replication provides functionality for replication of data within the storage node 2 shown in FIG. 1 or across nodes within the storage cluster 5A and/or 5B shown in FIG. 1. This functionality can optionally be implemented using the replication module 44E. Capacity expansion provides functionality for adding storage capacity (e.g., one or more mass storage devices and/or storage nodes 2 shown in FIG. 1). This functionality can optionally be implemented using the capacity expansion module 44F. De-duplication provides functionality for de-duplicating data stored in the data storage system. This functionality can optionally be implemented using the de-duplication module 44G.

Figure 3:
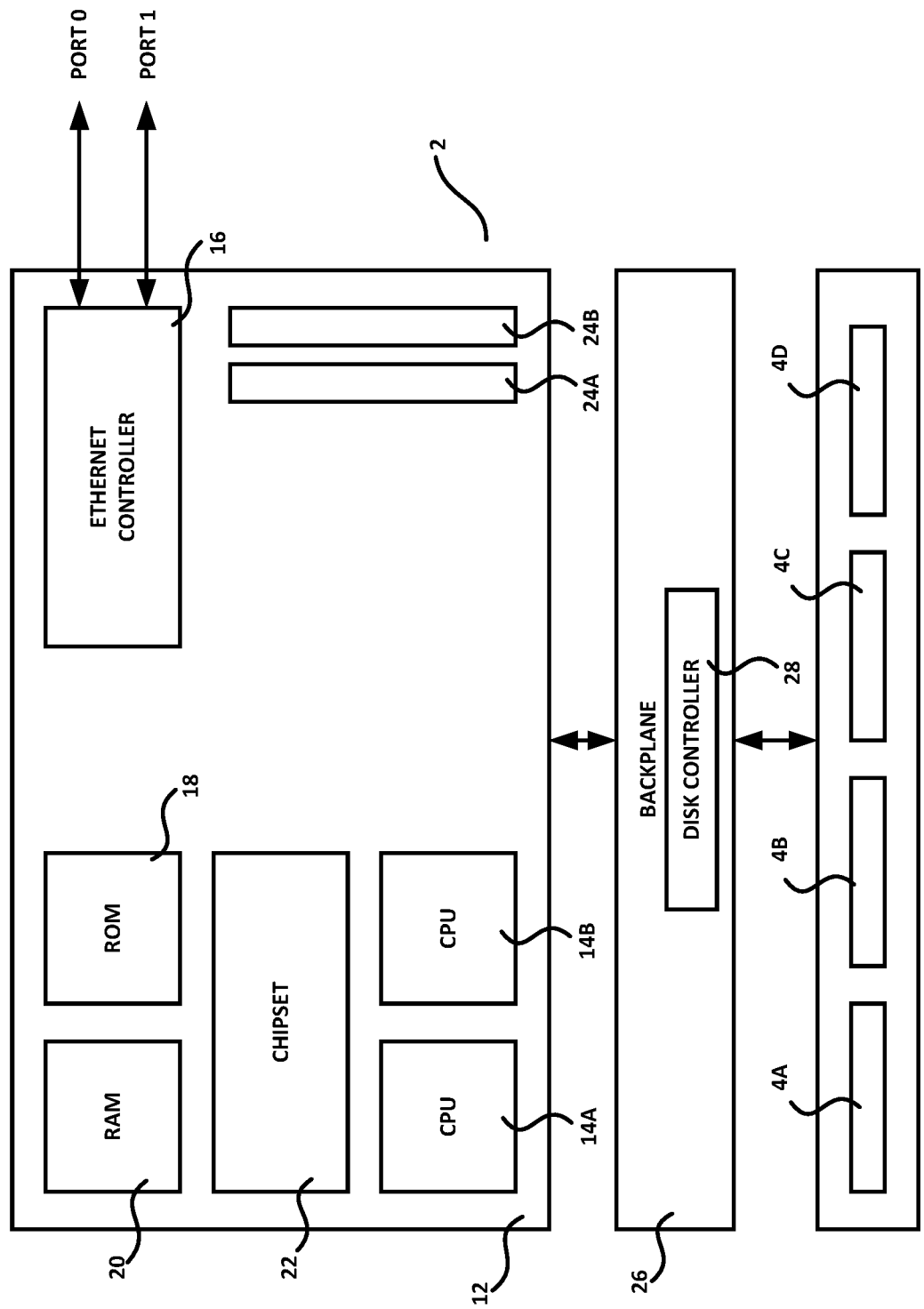
FIG. 3 is a computer architecture diagram illustrating aspects of the hardware of an illustrative storage server computer according to an implementation described herein.

Referring now to FIG. 3, an illustrative computer hardware architecture for practicing various embodiments will now be described. In particular, FIG. 3 shows an illustrative computer architecture and implementation for each storage node 2 shown in FIG. 1. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units (CPUs) 14A-14B, a network adapter, such as the Ethernet controller 16, a system memory, including a Read Only Memory 18 (ROM) and a Random Access Memory 20 (RAM), and other hardware for performing input and output, such as a video display adapter or a universal serial bus port (USB), not all of which are illustrated in FIG. 3.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciated that, although not illustrated in FIG. 3, a RAID controller may also be embedded on the motherboard 12 or implemented in software by the storage server computer 2. It is also contemplated that the storage server computer 2 may include other components that are not explicitly shown in FIG. 3 or may include fewer components than illustrated in FIG. 3.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system (BIOS) or Extensible Firmware Interface (EFI) compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include local area network (LAN) or wide area network (WAN) connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 3, the motherboard 12 is connected via a backplane 26 and disk controller 28 to one or more mass storage devices. The mass storage devices may comprise SSDs, hard disk drives 4A-4D (collectively, disks 4) or other types of high capacity high speed storage. As described herein, physical storage of the data storage system includes one or more SSDs. The disk controller 28 may interface with the hard disk drives 4A-4D and/or SSDs through a serial advanced technology attachment (SATA) interface, a small computer system interface (SCSI), a fiber channel (FC) interface, a SAS interface, NVMe interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Figure 4:
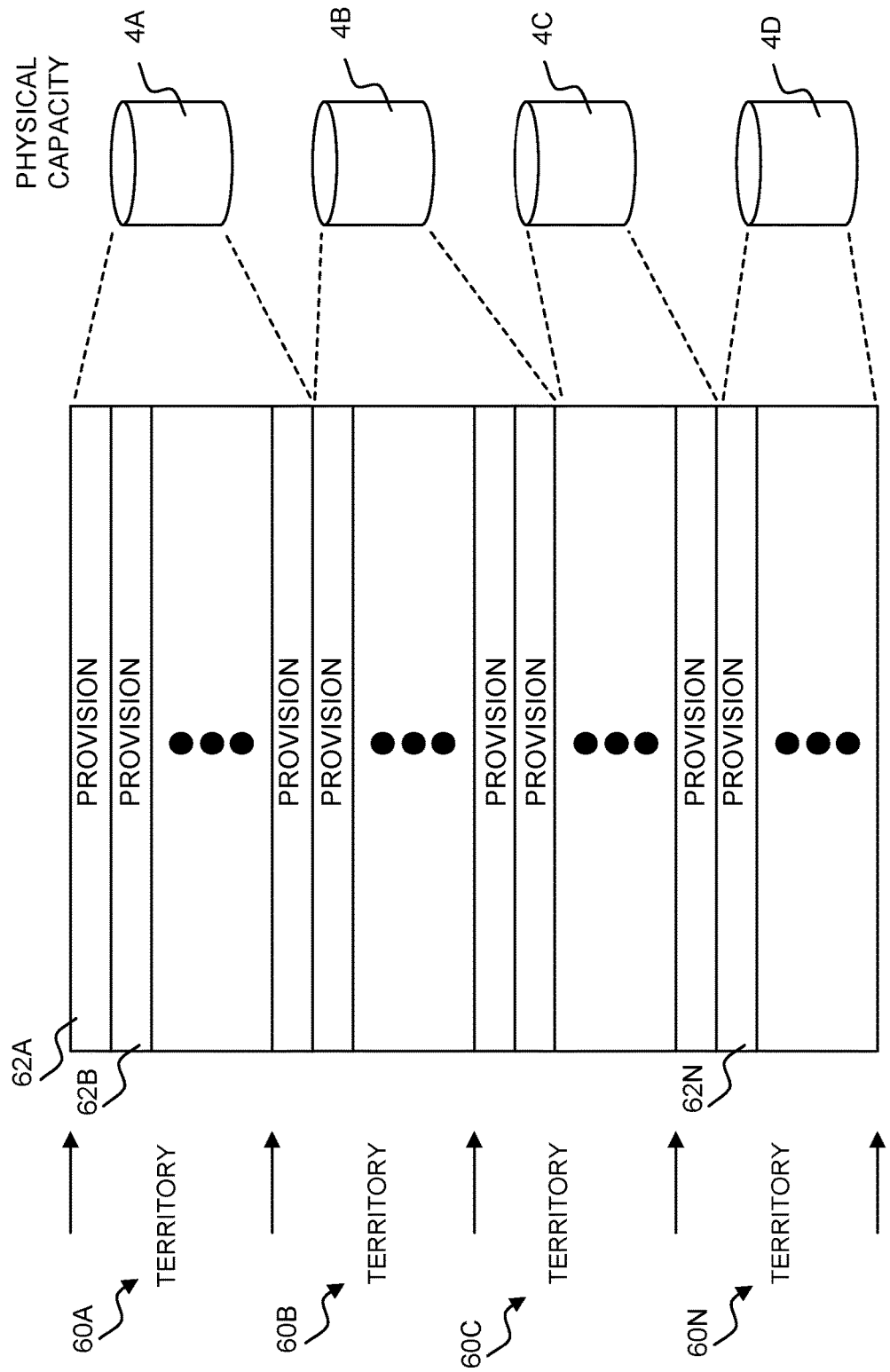
FIG. 4 illustrates an example division of the physical capacity of a storage system into provisions and territories according to an implementation described herein.

Referring now to FIG. 4, additional details regarding the division of the physical capacity of the storage server computer 2 into provisions 62A-62N and territories 60A-60N will be provided. As shown in FIG. 4, the available physical capacity of the storage server computer 2 is made up of a number of hard disk drives 4A-4D. It should be understood that the physical capacity of the computer 2 can also include one or more SSDs or other type of high capacity high speed storage device. Optionally, the SSDs and optionally hard disk drives 4A-4D (collectively, disks 4) can be part of a tiered storage system as described herein. It should be appreciated that other computer nodes connected to the storage server computer 2 may also contribute physical capacity to the available physical capacity of the storage server computer 2. As also shown in FIG. 4, the available physical capacity is divided into a number of unique, equally sized areas, called territories 60A-60N. Additionally, the physical storage space can be allocated to a logical volume from one or more of the SSDs and/or hard disk drives 4A-4D. The physical space may be allocated to the logical volumes in territories, or alternatively provisions. In some implementations, size of a territory may be one gigabyte (GB). In other implementations, the size of a territory may be approximately 8 megabytes (MB). Alternatively, it should be understood that a territory can optionally have a size more or less than 1 GB or 8 MB.

As also shown in FIG. 4, the available physical capacity is further subdivided into units referred to herein as provisions 62A-62N. The provisions 62A-62N comprise unique, equally sized areas of the available physical capacity and are smaller in size than the territories 60A-60N. In some implementations, the provisions 62A-62N are one megabyte (MB) in size. Accordingly, each 1 GB territory includes one thousand and twenty-four provisions. In other implementations, the size of a provision may be approximately 512 kilobytes (KB). Alternatively, it should be understood that a provision can optionally have a size more or less than 1 MB or 512 KB. It should be appreciated that provisions of other sizes may also be utilized, and multiple provision and territory granularities may co-exist in the same server.

Figure 5:
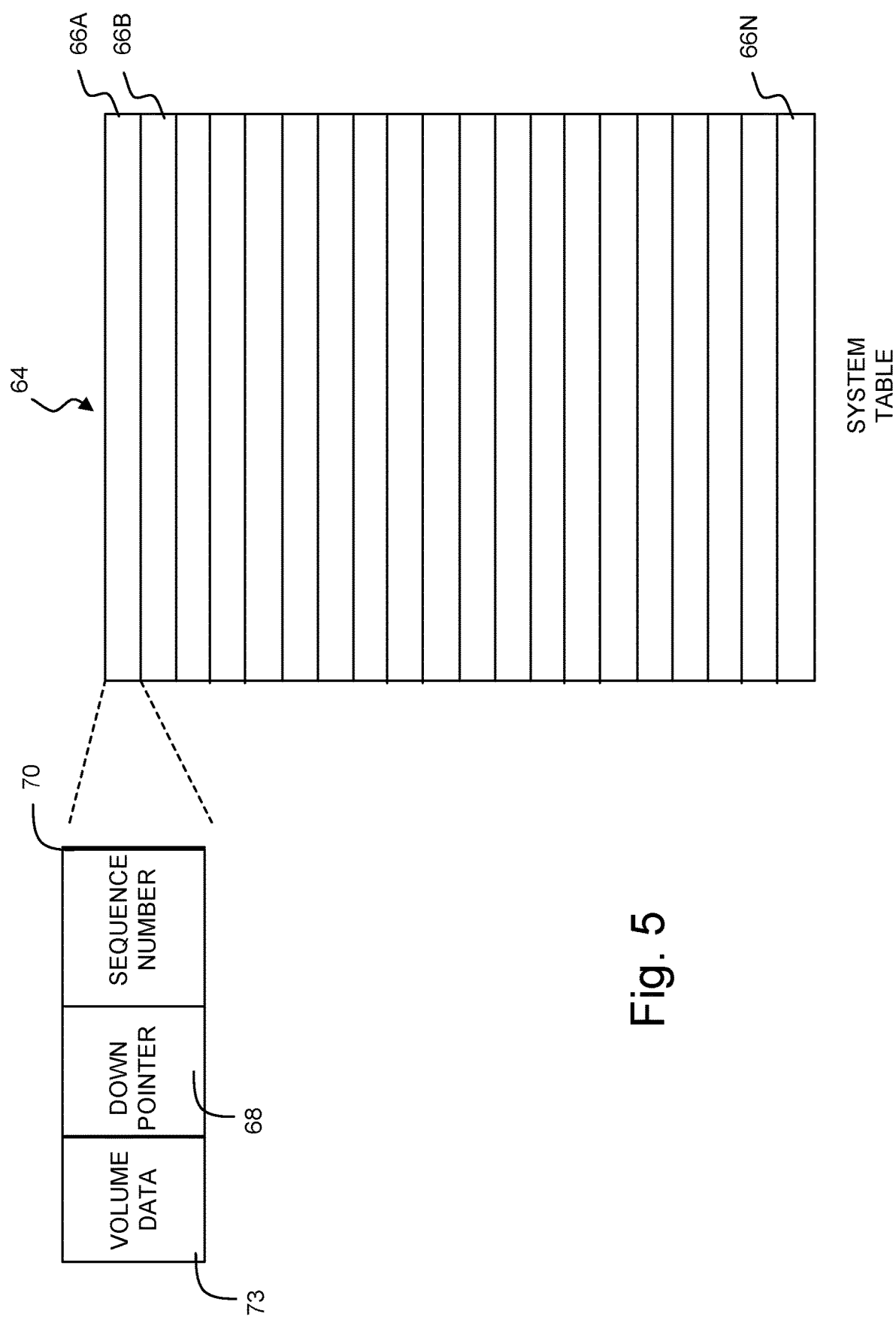
FIG. 5 illustrates an example system table according to an implementation described herein.
Figure 6:
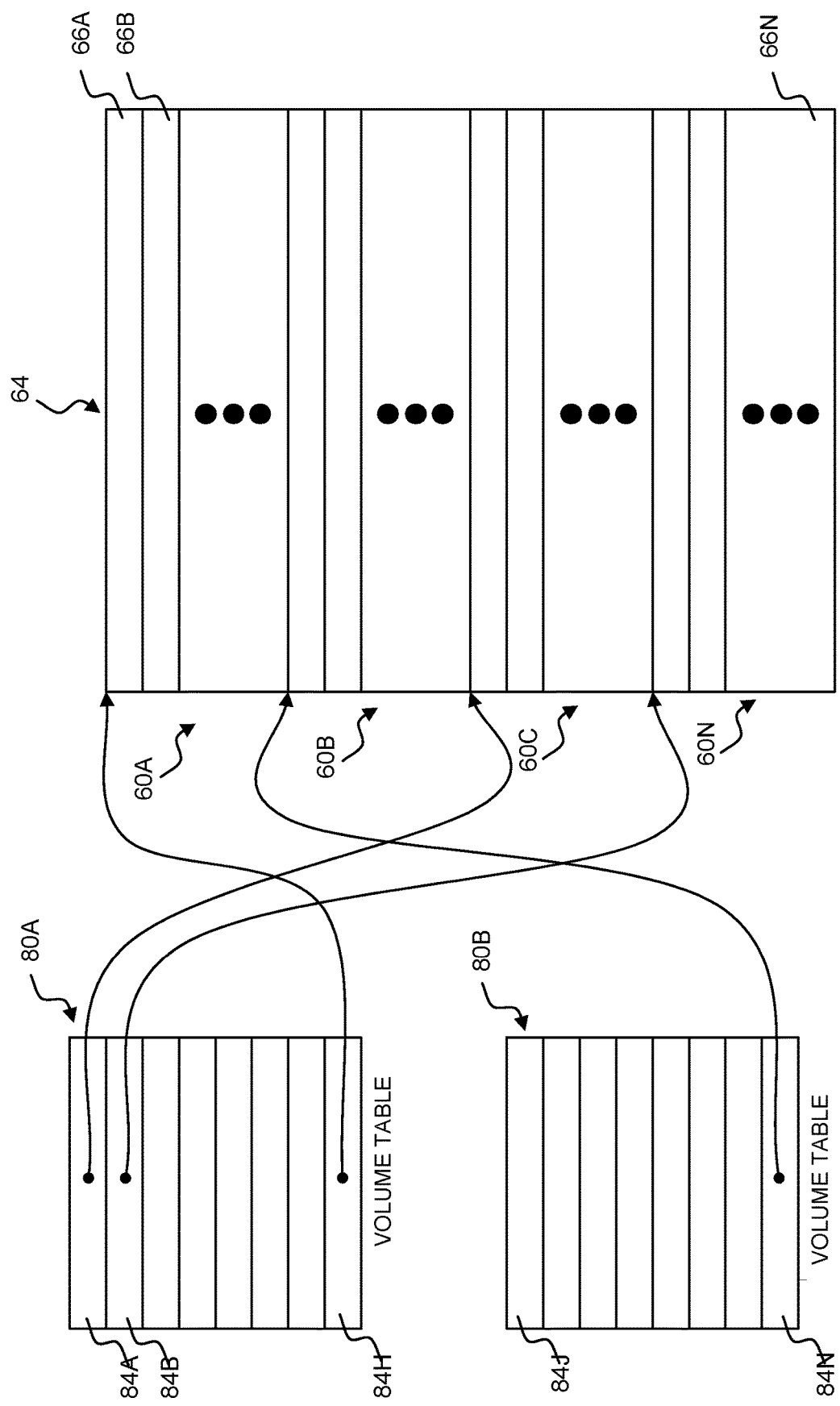
FIG. 6 illustrates example volume tables and an example system table according to an implementation described herein.

Turning now to FIG. 5, additional details regarding the structure and use of a system table data structure provided by aspects of this disclosure will be described. In particular, FIG. 5 illustrates a system table 64. This disclosure contemplates that the system table 64 (e.g., a "mapping table") can be maintained by the DVM module 44B shown in FIG. 2. The system table 64 includes a number of entries 66A-66N, each of which may be mapped to a unique portion of the available physical storage of the storage server computer 2 (e.g., a provision). If additional physical storage is made available to the storage server computer 2, then additional entries may be added to the system table 64 that correspond to portions of the newly added storage. According to aspects of this disclosure, each of the entries 66A-66N in the system table 64 corresponds to a provision within the available physical storage space of the storage server computer 2.

As also shown in FIG. 5, each entry 66A-66N in the system table 64 contains a number of data fields that implement a variety of advanced storage features. For example, each entry may include a down pointer field 68, and a sequence number field 70. The down pointer field 68 may be utilized to store a pointer to another entry in the system table 64 that identifies the next physical provision belonging to the same logical volume and with the same logical provision number.

In some implementations, the system table 64 may further include volume data 73. The volume data 73 may include a record of the amount of physical storage space (e.g., provisions or territories) that have been reserved for each logical volume, and a record of the amount of physical storage space that has actually been allocated to each volume. When a user or administrator creates a logical volume of a selected size, an entry in the volume data 73 may be made for the volume that indicates the selected size. Later, as data is written to the volume, and physical storage space is allocated to the logical volume, the record of the amount of space that has been allocated to the logical volume thus far can be compared with the selected size of the volume to ensure that space greater than the reserved space is not allocated to the volume. The pointers to the actual location in physical storage need only be assigned when the write I/O operation is received.

The system table 64 can be maintained by the storage server computer 2 and stored in the RAM 18 of the storage server computer 2 for fast access. Referring now to FIG. 6, additional details regarding the system table and a volume table data structure provided by and utilized by aspects of this disclosure will be described. As shown in FIG. 6, a volume table 80A, 80B is utilized for each logical storage volume defined in the storage server computer 2. This disclosure contemplates that the volume table 80A, 80B (e.g., a "mapping table") can be maintained by the DVM module 44B shown in FIG. 2. The volume table 80A, 80B can also be maintained by the storage server computer 2 and stored in the RAM 18 of the storage server computer 2 for fast access. The volume tables 80A-80B include entries 84A-84H and 84J-84N, respectively, for each territory in a logical volume. For instance, the entry 84A corresponds to the first territory in the volume corresponding to the volume table 80A. Other entries in the volume table correspond to other portions of the logical volume. Alternatively, the volume tables 80A-80B may include entries that identify each provision in the logical volumes corresponding to the tables.

Each entry in a volume table 80A, 80B can be utilized to store a pointer to a territory in the system table 64, or alternatively a pointer to a provision of the available physical storage space. When a logical volume of a specified size is created by a user or administrator, a volume table 80A, 80B is initially created. The volume table 80A, 80B may include a number of entries proportional to the size of the logical volume. For example, if the logical volume includes ten territories, the volume table may include ten entries.

Further, when the volume table 80A, 80B is initially created by a user or administrator each entry may be set to a null value or some other value that may indicate that that territory or provision associated with the entry in the volume table 80A, 80B has not yet been allocated to the logical storage volume associated with the volume table 80A, 80B. At a later time, when a write request (e.g., a write I/O operation) is received for one of the volumes, storage space is allocated to the volume, and a pointer is created to the allocated storage space. For instance, a first write request may be received that is directed to the territory referenced by the entry 84H of the volume table 80A. In response to the request, physical space is allocated to the volume by creating a pointer in the entry 84H to the next available territory, the territory 60A, in the system table 64. If a second write request is received directed to the territory referenced by the entry 84N in the volume table 80B, space is allocated by creating a pointer in the entry 84N to the next available territory 60B. A third write operation directed to a portion of the volume corresponding to the entry 84A will cause a pointer to be created to the territory 60C. Similarly, a fourth write operation that is directed to a portion of the volume corresponding to the entry 84B will cause a pointer to be created to the territory 60N referenced by the system table 64. In this manner, physical space is allocated for logical territories within volumes on an as needed basis.

It should be appreciated that there is no requirement that territories and/or provisions must necessarily be of the same size. For example, sparse writes may be stored together in one territory with entries in the system table to distinguish them. It is also possible to adaptively allocate territories of different sizes to different kinds of I/O loads.

Depending on the implementations, when read operations are received, it may be necessary to utilize both the volume table for the corresponding logical volume and the system table to perform the read operation. In particular, where the entries in the volume table point to territories, when a read operation is received for a logical volume, the volume table is examined to determine the location within the system table that refers to the territory where the requested data is stored. From the system table, the start of the physical location containing the requested territory can be determined. The offset within the particular territory can then be utilized to locate the actual data.

In implementations where the entries in the volume tables point to provisions, it may not be necessary to reference the system table when reading data from a logical volume. When a read operation is received for a logical volume, the volume table corresponding to the logical volume is examined to determine the provision where the requested data is stored.

According to some implementations, the storage server storage server computer 2 receives and responds to requests to read or write data to a tiered storage system. For example, the tiered storage system includes a plurality of storage devices (e.g., disks 4 as shown in FIGS. 1-3 and/or SSDs), and the storage server storage server computer 2 assigns each of the storage devices to one of a plurality of tiers. The storage server computer can optionally also impose a hierarchy on the tiers. Storage devices having better performance characteristics reside in relatively higher tiers, while storage devices having worse performance characteristics reside in relatively lower tiers. In some implementations, the hierarchy can be imposed on the tiers based, at least in part, on the types of drives. As one example, the tiered storage system can include three tiers, where the top tier (e.g., high-performance tier) includes one or more SSDs, the middle tier includes one or more SAS drives, and the bottom tier (e.g., low-performance tier) includes one or more NL SAS drives. It should be understood that the tiered storage system can include different numbers of tiers, different numbers of drives, and/or different types of drives than those provided in the example above. Alternatively or additionally, the hierarchy can be imposed on the tiers based, at least in part, on the different performance characteristics of the storage devices. Performance characteristics can include, but are not limited to, rotations per minute (RPM), cost, RAID configuration, speed, number of spares, and/or logical drive state. This disclosure contemplates that a storage device's performance characteristics can be considered as a factor when assigning the storage device to a tier.

The TRIM command is the SATA command that enables a data storage system (e.g., the operating system thereof) to inform an SSD which blocks are invalid. Such blocks contain data that is no longer used by the data storage system, which can be deleted and/or marked free for rewriting. It should be understood that the TRIM command is known in the art. As discussed below, the TRIM command improves performance of the data storage system and also extends the operational lifetime of the SSD. An SSD is divided into blocks, which are further subdivided into pages. While data can be written to an empty page, only blocks of data can be deleted. Thus, to overwrite a page of invalid data, the entire block must be deleted. To accomplish this, the valid pages of data are first copied to a buffer and then written to empty pages of a new block before the block of data is deleted. This process is sometimes referred to as garbage collection. It should be understood that garbage collection contributes to write amplification. In other words, the I/O operations needed to write the valid pages of data to the new block do not originate with an initiator (e.g., initiators 8 as shown in FIG. 1). These I/O operations instead are issued by the data storage system itself. Write amplification reduces operational lifetime of the SSD since SSDs have a limited number of program-erase cycles.

The TRIM command allows the data storage system to mark pages of the SSD as invalid. Once marked as invalid, the contents of the data block are not preserved. In other words, the garbage collection process described above, where valid pages of data are copied to a buffer and then written to a new block, is not performed. This reduces the amount of write amplification and also increases the operation lifetime of the SSD. Conventionally, the TRIM command is issued by an application or operating system (OS) running on an initiator (e.g., higher layer in the storage stack) or the RAID system (e.g., lower layer in the storage stack). In these circumstances, the TRIM command is not efficient because the initiator and/or RAID system may not be aware of the data storage system metadata over the network. As described above with regard to FIG. 2, the device driver 42 sits between the storage volumes or fileshares and the unified RAID management layer 40 in the storage stack 30. And, the DVM module 44B of the device driver 42 maintains a mapping table (e.g., system and/or volume tables) for tracking logical blocks of the logical volume. Using a map-based architecture, the DVM module 44B can efficiently track which blocks of data are in use, and thus, the DVM module 44B can execute the TRIM command over the network to inform the SSD as to which pages/blocks need to be marked invalid.

As discussed above, executing the TRIM command with the DVM module has advantages. Additionally, the timing of execution of the TRIM command is important. It should be understood that firing the TRIM command for each and every page/block of the SSD which is freed would come with a penalty and negatively affect performance of the data storage system. This is because the TRIM command, even when executed by the DVM module, uses system resources. The DVM module 44B can therefore be configured to execute the TRIM command over the network in response to a predetermined event. Accordingly, the DVM module 44B can use it ability to track blocks of data which are in use or free while also selecting particular junctures during runtime to execute the TRIM command that give the most benefit in using the TRIM command.

Snapshot Deletion

In some implementations, the predetermined event is deletion of a snapshot. When a snapshot is deleted, data is freed in blocks. The freed data, however, may be spread across physical storage of the data storage system, which can include one or more SSDs as described above. This is referred to as fragmentation. The DVM module 44B, being a map-based architecture, can easily compact the used data blocks and modify the mapping table (e.g., system and/or volume tables) accordingly. This in turn creates large, contiguous unused data blocks. Again, the DVM module 44B, being a map-based architecture, can then consult the mapping table (e.g., system and/or volume table) and execute the TRIM command for one or more unused data blocks of an SSD over the network.

File Deletion

In some implementations, the predetermined event is deletion of a file. In a file-based data storage system, whenever a file is deleted, the DVM module 44B is aware of what areas are marked as free. For example, as described above with regard to FIG. 2, the device driver 42 sits between the fileshares (e.g., NAS path) and the unified RAID management layer 40 in the storage stack 30. Thus, in response to file deletion, the DVM module 44B, being a map-based architecture, can consult the mapping table (e.g., system and/or volume table) and execute the TRIM command for one or more unused data blocks of an SSD over the network. Optionally, in some implementations, the predetermined event is deletion of a threshold number of files. The threshold number of files can be any number of files and optionally based on the size of files stored by the data storage system. Although the DVM module 44B could execute a TRIM command for every file deletion, such operations may consume too many system resources. Thus, the DVM module 44B can be configured to wait for a threshold number of files to be deleted before executing the TRIM command. This may be particularly useful when the data storage system stores a large number of small files.

UNMAP or WRITE SAME Commands

In some implementations, the predetermined event is modification of a mapping table (e.g., system and/or volume tables). An UNMAP command or WRITE SAME command can be used to reclaim storage space that has been written to after the data residing in certain data blocks has been deleted by an application or OS running on an initiator (e.g., initiator 8 shown in FIG. 1). It should be understood that UNMAP and WRITE SAME commands are SCSI commands known in the art. As described above with regard to FIG. 2, the device driver 42 sits between the exposed volumes (e.g., SAN path) and the unified RAID management layer 40 in the storage stack 30. Thus, when the application or OS of an initiator fires an UNMAP command or WRITE SAME command, the DVM module 44B frees up large, contiguous unused data blocks. Again, the DVM module 44B, being a map-based architecture, can then modify the mapping table (e.g., system and/or volume table) and execute the TRIM command for one or more unused data blocks of an SSD over the network. It should be understood that the DVM module 44B only modifies the mapping table (e.g., system and/or volume table) to mark those sections as unused. And, while modifying the mapping table, the DVM module 44B can execute the TRIM command for one or more unused data blocks of an SSD.

Data Movement

In some implementations, the predetermined event can be demotion of data from the SSD to a lower-tier storage device in the physical storage. As described above, the data storage system can be a tiered storage system, where the storage server computer (e.g., node 2 in FIGS. 1 and 3) can optionally also impose a hierarchy on the tiers. Storage devices having better performance characteristics reside in relatively higher tiers, while storage devices having worse performance characteristics reside in relatively lower tiers. This disclosure contemplates that SSDs can be included in the top tier because SSDs are high-performance drives. Data can be moved between tiers based on the time of last access, frequency of access, or combinations thereof. This can ensure that "hot" data is stored in higher performance drives. Data migration is known in the art. For example, techniques for data migration are described in detail in U.S. Pat. No. 9,519,438 to Chatterjee et al., issued Dec. 13, 2016, and entitled "DATA MIGRATION BETWEEN MULTIPLE TIERS IN A STORAGE SYSTEM USING AGE AND FREQUENCY STATISTICS;" and U.S. Ser. No. 13/449,713, filed Apr. 18, 2012, and entitled "SPACE CONSOLIDATION AMONG NODES IN A STORAGE CLUSTER."

In some implementations, less frequently used and/or less frequently accessed data can be moved to a lower tier(s) (e.g., demoted) in the data storage system. This can include moving data from one or more SSDs to lower performance drives. In other implementations, more frequently used and/or more frequently accessed data can be moved to a higher tier(s) (e.g., promoted) in the data storage system. Additionally, the DVM module 44B can be configured to migrate contiguous blocks of data such as territories (e.g., 8 MB blocks of data). When the DVM module 44B demotes data to a lower tier, space can be freed by the DVM module 44B. In other words, in response to demotion of data, the DVM module 44B can free up large, contiguous unused data blocks. And, the DVM module 44B, being a map-based architecture, can then modify the mapping table (e.g., system and/or volume table) and execute the TRIM command for one or more unused data blocks of an SSD over the network.

Cache Flushing

In some implementations, the predetermined event can be flushing of an SSD cache to the physical storage. This disclosure contemplates that one or more SSDs can be used as a caching medium for the data storage system. The use of SSDs as a caching medium is known in the art. For example, techniques for using SSDs as a caching medium are described in U.S. Pat. No. 10,019,362 to Chatterjee et al., issued Jul. 10, 2018, and entitled "SYSTEMS, DEVICES AND METHODS USING SOLID STATE DEVICES AS A CACHING MEDIUM WITH ADAPTIVE STRIPING AND MIRRORING REGIONS;" and U.S. Ser. No. 15/145,111, filed May 3, 2016, and entitled "SYSTEMS, DEVICES AND METHODS USING A SOLID STATE DEVICE AS A CACHING MEDIUM WITH A WRITE CACHE FLUSHING ALGORITHM." For example, when an SSD is used as a caching medium, the SSD caching medium can be treated as a journal device, and when the journal device is flushed to a volume residing in the data storage system, blocks in the SSD caching medium can be freed. In some implementations, the entire SSD caching medium is flushed to the data storage system. In other implementations, only a portion of the SSD caching medium is flushed to the data storage system. The DVM module 44B, being a map-based architecture, can then modify the mapping table (e.g., system and/or volume table) and execute the TRIM command for one or more unused data blocks of the SSD caching medium.

TRIM Operations Combined with Workflow

In some implementations, the I/O load of the data storage system can be taken into account before executing TRIM operations. As described above, TRIM operations consume data storage system resources. Accordingly, the DVM module 44B can be configured to determine the I/O load of the data storage system and then only execute the TRIM command over the network when the I/O load is less than a threshold. The threshold value can be any value chosen, for example, by an administrator of the data storage system. In other words, TRIM operations can be performed only in periods of relatively lower load. When I/O load is relatively higher, the DVM module 44B can forego issuing the TRIM command. In some implementations, TRIM operations performed in periods of relatively lower load are considered offline (also referred to as background) operations.

Offline or Background TRIM Operations

This disclosure contemplates that TRIM operations can be performed inline or offline (background). As described above, the DVM module (e.g., DVM module 44B in FIG. 2) maintains the mapping table, which can be the system and/or volume tables described herein with regard to FIGS. 5 and 6, for tracking logical blocks. It should be understood that that the mapping table may require a vast amount of storage space, e.g., in terabyte (TB), petabyte (PB), or even high scales. As discussed above, TRIM operations require computing resources and can impact system performance. When TRIM operations are performed inline, there is no need to scan the mapping table to find which logical blocks need to be marked invalid because the act of marking a territory or provision as invalid happens at runtime based on the volume logical block address (LBA), and thus, the TRIM operation can be executed at that time (and optionally, when workflow is taken into account, assuming the I/O load is not above threshold). On the other hand, when TRIM operations are performed offline (background), the mapping table would need to be scanned to identify the logical blocks to mark as invalid. Scanning the mapping table is a costly memory operation and may trash the computing caches, which may lead to longer memory look up times for running I/O operations and/or consume processing time. To avoid such an undesirable consequences, an invalid bucket with one or more linked lists (see FIG. 8) can be maintained. An invalid linked list (as opposed to the mapping table) can be traversed to find the logical blocks (e.g., territories and/or provisions) on which TRIM operations need to be performed. It should be understood that traversing a smaller number of pointers in a linked list requires less computing resources than scanning the mapping table.

Figure 8:
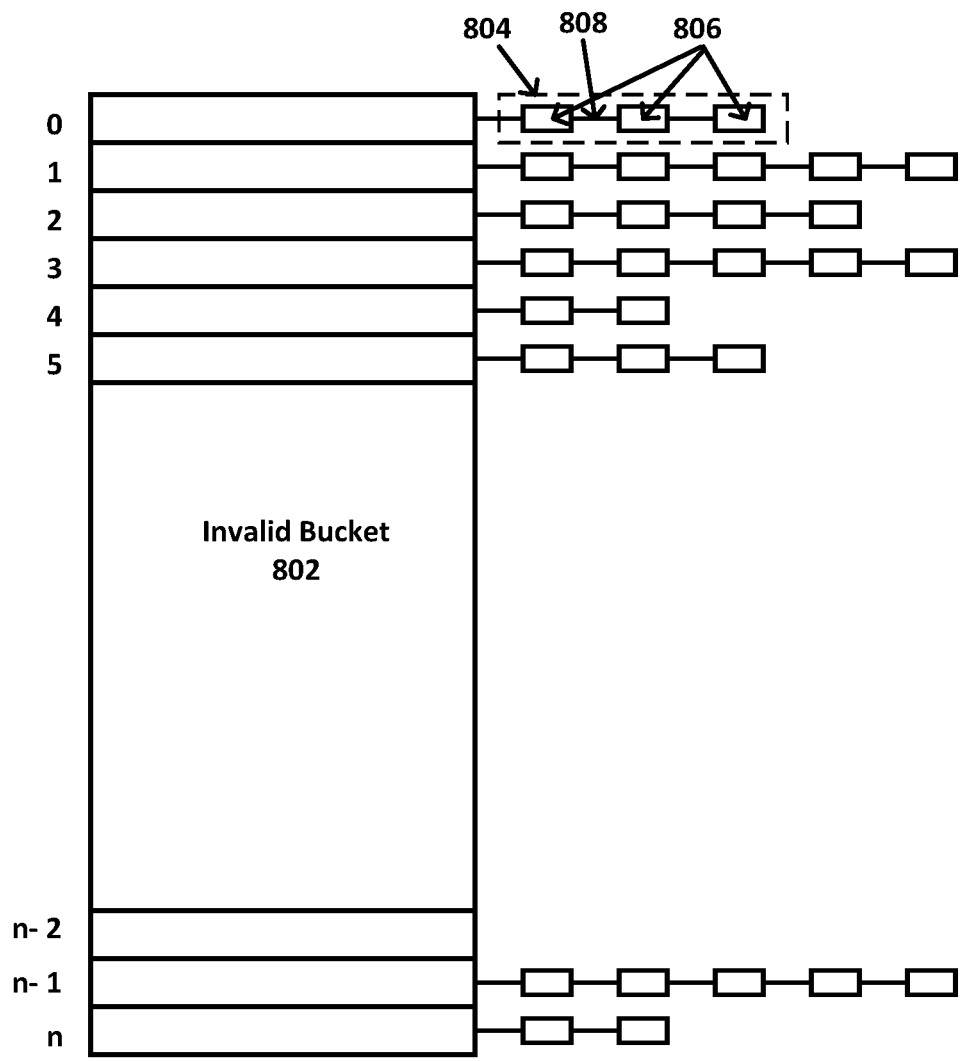
FIG. 8 illustrates an example invalid bucket with a plurality of linked lists according to an implementation described herein.

Referring now to FIG. 8, an example invalid bucket 802 is described. As shown in FIG. 8, the invalid bucket 802 includes a plurality of linked lists 804. For example, as described below, each tier/logical drive can have its own linked list 804. The linked list 804 can include a plurality of nodes 806, which are linked by pointers 808. This disclosure contemplates that the linked list 804 can be a single linked list (e.g., containing pointers to next node) or a doubly linked list (e.g., containing pointers to both previous and next nodes). Each node 806 can store the logical block address of a logical block (e.g., a territory or provision) on which TRIM operations need to be performed. The linked list 804 can be populated with addresses of logical block(s) (e.g., territory and/or provision) on every free operation (e.g., indicating that a particular logical block can be deleted and/or overwritten) when the TRIM operation cannot be performed inline. Then, when the TRIM operations are performed later offline (background), the linked list 804 can be traversed to determine which logical blocks to issue TRIM commands. The state of a logical block in this scenario is as follows: free→allocated→Invalid Bucket Linked List→TRIM operation→free.

As shown in FIG. 8, the invalid bucket 802 includes a plurality of linked lists 804. Each tier/logical drive can have its own linked list 804. For example, bucket 0 includes the linked list for tier 0/logical drive 0; bucket 1 includes the linked list for tier 0/logical drive 1; bucket 2 includes the linked list for tier 0/logical drive x; bucket 3 includes the linked list for tier 1/logical drive 0; bucket 4 includes the linked list for tier 1/logical drive 1; bucket 5 includes the linked list for tier 1/logical drive y; . . . bucket n–2 includes the linked list for tier n/logical drive 0; bucket n–1 includes the linked list for tier n/logical drive 1; and bucket n includes the linked list for tier n/logical drive z. Each of the linked lists 804 contains one or more nodes 806 storing LBAs of logical blocks (e.g., territories or provisions) on which TRIM operations need to be performed. This disclosure contemplates that the number of linked lists and/or number of nodes shown in FIG. 8 are provided only as examples.

By providing a respective linked list 804 for each tier/logical drive, it is possible to save or reduce the number of TRIM operations. For example, in response to a logical block (e.g., territory or provision) allocation request, a logical block contained in the linked list 804 for a particular tier/logical drive can be reused based on volume priority categories. By reusing logical blocks in the linked lists 804, the number of TRIM operations can be reduced. In other words, the logical block is reallocated before performing the TRIM operation, which saves performance of the same. The state of a logical block in this scenario is as follows: free→allocated→Invalid Bucket Linked List→allocated. If the linked list 804 for a particular tier/logical drive does not contain a logical block (e.g., territory or provision) for reuse, then the allocation request can be satisfied by consulting a free logical block bitmap (see FIG. 9).

Figure 9:
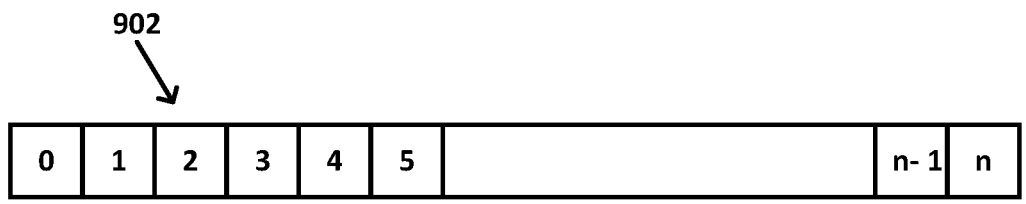
FIG. 9 illustrates an example free logical block bitmap according to an implementation described herein.

Referring now to FIG. 9, an example free logical block bitmap is described. Similarly to the invalid bucket with one or more linked lists, a free logical block bitmap can be maintained for each tier/logical drive. For example, a respective bitmap can be maintained for each of tier 0/logical drive 0; tier 0/logical drive 1; tier 0/logical drive x; ... tier n/logical drive z. An example free logical block bitmap 902 is shown in FIG. 9. Each bit (i.e., bits 0, 1, 2, 3, 4, 5, ... n−1, n) can be set to one (1) when the logical block (e.g., territory or provision) is allocated and set to zero (0) when the logical block (e.g., territory or provision) is free.

Additionally, while a TRIM operation is being performed, no I/O operations would fall in that region (e.g., territory or provision), as it is a region which is not in use and would not be assigned to a new allocation. The region (e.g., territory or provision) is not be available for allocation because it is removed from the linked list (see FIG. 8) and has no association with any tables (see FIGS. 5 and 6) until the TRIM operation is complete. Once the TRIM operation is complete, the region (e.g., territory or provision) is returned to the free logical block list (see FIG. 9). Accordingly, I/O operation locking is not required.

It should be appreciated that the logical operations described herein with respect to the various figures may be implemented (1) as a sequence of computer implemented acts or program modules (i.e., software) running on a computing device (e.g., the storage system computer described in FIG. 3), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 7:
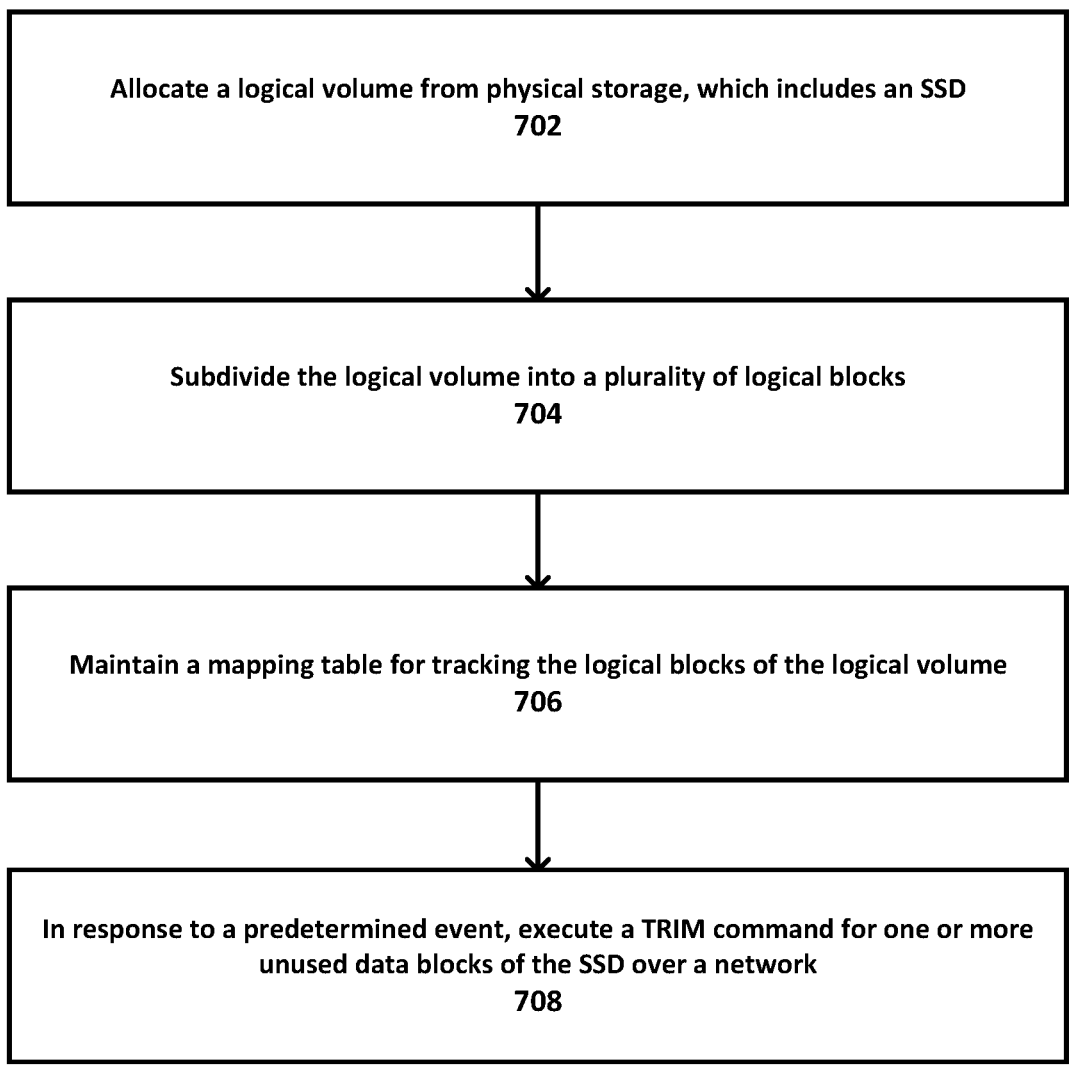
FIG. 7 is a flowchart illustrating example operations for performing TRIM operations in a data storage system according to an implementation described herein.

Referring now to FIG. 7, a flowchart illustrating example operations for performing TRIM commands in a data storage system are described. This disclosure contemplates that the operations shown in FIG. 7 can be executed by the storage server computer 2 as shown in FIG. 3. The storage server computer 2 can be operably coupled to physical storage over a network. This disclosure contemplates that the network, such as a LAN, a WAN, a MAN, a fiber ring, a fiber star, wireless, optical, satellite, or any other network technology, topology, protocol, or combination thereof. Additionally, this disclosure contemplates that the storage server computer can implement the computer software stack 30 as shown in FIG. 2, which includes DVM module 44B. As described above, the example operations shown in FIG. 7 can be implemented by the DVM module. At step 702, a logical volume is allocated from physical storage including an SSD. At step 704, the logical volume is subdivided into a plurality of logical blocks. The logical blocks can include, but are not limited to, territories and/or provisions as described herein. At step 706, a mapping table is maintained for tracking the logical blocks of the logical volume. As described herein, the DVM module can interface with a RAID management module to obtain information about the logical block-level interface, which facilitates maintenance of the mapping table. The mapping table can be the system and/or volume tables described herein with regard to FIGS. 5 and 6. The DVM module therefore has a map-based architecture. At step 708, and in response to a predetermined event, a TRIM command is executed for one or more unused data blocks of the SSD over the network. The DVM module can consult the mapping table to determine the one or more unused data blocks of the SSD. Optionally, as described herein, TRIM operations can be coordinated with I/O load on the data storage system to reduce the performance impact.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A data storage system, comprising:
   physical storage comprising a solid state drive (SSD);
   a storage system computer operably coupled to the physical storage over a network, the storage system computer comprising a processing unit and a memory, the memory being operably coupled to the processing unit; and
   a distributed volume management (DVM) module stored in the memory that, when executed by the processing unit, causes the processing unit to:
   allocate a logical volume from the physical storage;
   subdivide the logical volume into a plurality of logical blocks;
   maintain a mapping table for tracking the logical blocks of the logical volume;
   determine input/output (I/O) load of the data storage system; and
   in response to a predetermined event, execute a TRIM command for one or more unused data blocks of the SSD over the network, wherein the TRIM command is executed when the I/O load is less than a threshold.

2. The data storage system of claim 1, further comprising a redundant array of inexpensive disks (RAID) management layer stored in the memory that, when executed by the processing unit, causes the processing unit to abstract organization of one or more RAID arrays of the data storage system and present a logical block-level interface to the DVM module.

3. The data storage system of claim 2, wherein the DVM module, when executed by the processing unit, causes the processing unit to consult the RAID management layer to maintain the mapping table.

4. The data storage system of claim 1, wherein the DVM module, when executed by the processing unit, causes the processing unit to determine the one or more unused data blocks of the SSD by consulting the mapping table.

5. The data storage system of claim 1, wherein the predetermined event is deletion of a snapshot.

6. The data storage system of claim 1, wherein the predetermined event is deletion of a file.

7. The data storage system of claim 6, wherein the predetermined event is deletion of a threshold number of files.

8. The data storage system of claim 1, wherein the predetermined event is modification of the mapping table in response to an UNMAP command or a WRITE SAME command issued by an application or operating system (OS) running on an initiator device.

9. The data storage system of claim 1, wherein the predetermined event is demotion of data from the SSD to a lower-tier storage device in the physical storage.

10. The data storage system of claim 1, further comprising an SSD cache, wherein the predetermined event is flushing of the SSD cache to the physical storage.

11. The data storage system of claim 1, wherein the logical blocks comprise at least one of a territory or a provision.

12. The data storage system of claim 1, wherein the TRIM command is executed inline or offline.

13. The data storage system of claim 1, further comprising maintaining one or more linked lists, each linked list comprising one or more nodes, each node storing a respective logical block address of a respective logical block on which a TRIM operation needs to be performed offline.

14. The data storage system of claim 13, wherein each of the one or more linked lists corresponds to a respective tier and logical drive.

15. The data storage system of claim 1, further comprising maintaining one or more free logical block bitmaps.

16. The data storage system of claim 15, wherein each of the one or more free logical block bitmaps corresponds to a respective tier and logical drive.

17. A non-transitory computer-readable recording medium having computer-executable instructions stored thereon for performing TRIM operations with a distributed volume management (DVM) module that, when executed by a processing unit of a storage system computer, cause the processing unit to:
   allocate a logical volume from physical storage comprising a solid state drive (SSD), wherein the storage system computer and the physical storage are operably connected over a network;
   subdivide the logical volume into a plurality of logical blocks;
   maintain a mapping table for tracking the logical blocks of the logical volume;
   determine input/output (I/O) load of a storage system; and
   in response to a predetermined event, execute a TRIM command for one or more unused data blocks of the SSD over the network, wherein the TRIM command is executed when the I/O load is less than a threshold.

18. The non-transitory computer-readable recording medium of claim 17, having further computer-executable instructions stored thereon that, when executed by the processing unit, cause the processing unit to, using a redundant array of inexpensive disks (RAID) management layer, abstract organization of one or more RAID arrays of the storage system and present a logical block-level interface to the DVM module.

19. The non-transitory computer-readable recording medium of claim 17, wherein the DVM module consults the RAID management layer to maintain the mapping table.

20. A data storage system, comprising:
   physical storage comprising a solid state drive (SSD);
   an SSD cache;
   a storage system computer operably coupled to the physical storage over a network, the storage system computer comprising a processing unit and a memory, the memory being operably coupled to the processing unit; and
   a distributed volume management (DVM) module stored in the memory that, when executed by the processing unit, causes the processing unit to:
      allocate a logical volume from the physical storage;
      subdivide the logical volume into a plurality of logical blocks;
      maintain a mapping table for tracking the logical blocks of the logical volume; and
      in response to a predetermined event, execute a TRIM command for one or more unused data blocks of the SSD over the network, wherein the predetermined event is flushing of the SSD cache to the physical storage.

\* \* \* \* \*